United States Patent
Xiao et al.

(10) Patent No.: US 12,434,623 B2
(45) Date of Patent: Oct. 7, 2025

(54) APPARATUS WITH LIGHT FIXTURE

(71) Applicant: Rivian IP Holdings, LLC, Irvine, CA (US)

(72) Inventors: Yifu Xiao, Costa Mesa, CA (US); Shammika Ashan Wickramasinghe, Banbury (GB); Simon Baker, Basingstoke (GB); Vijay Jayaraman, Irvine, CA (US); Srikanth Amruthur, Lake Forest, CA (US); Erik Robert Glaser, San Mateo, CA (US); Diana Betzabe Cuellar Alcala, Irvine, CA (US); Jonathan James Szczupak, Laguna Niguel, CA (US)

(73) Assignee: Rivian IP Holdings, LLC

( * ) Notice: Subject to any disclaimer, the term of this patent is extended or adjusted under 35 U.S.C. 154(b) by 0 days.

(21) Appl. No.: 18/752,179

(22) Filed: Jun. 24, 2024

(65) Prior Publication Data
US 2025/0256645 A1    Aug. 14, 2025

Related U.S. Application Data

(60) Provisional application No. 63/553,325, filed on Feb. 14, 2024.

(51) Int. Cl.
     *B60Q 1/50*      (2006.01)
     *B60L 53/16*      (2019.01)
     (Continued)

(52) U.S. Cl.
     CPC ............... *B60Q 1/543* (2022.05); *B60L 53/16* (2019.02); *B60L 53/60* (2019.02); *B60Q 1/2607* (2013.01);
     (Continued)

(58) Field of Classification Search
     CPC .......... B60Q 1/18; B60Q 1/543; F21S 43/145
     See application file for complete search history.

(56) References Cited

U.S. PATENT DOCUMENTS

| | | |
|---|---|---|
| 8,322,902 B2 | 12/2012 | Martin et al. |
| 8,789,991 B2 | 7/2014 | Martin et al. |
| (Continued) | | |

FOREIGN PATENT DOCUMENTS

| | | |
|---|---|---|
| EP | 2 161 494 A1 | 11/2011 |
| EP | 2 792 940 B1 | 9/2016 |
| EP | 2 098 774 B1 | 7/2020 |

OTHER PUBLICATIONS

Amazon Website; Dynamic Scan Start Up Hood Light Strip Sequential Flowing Turn Signal Flexible DRL Daytime Running Car LED Light Strip Exterior, Dual Color Amber White Switchback 12V 70inch (1 Set); https://www.amazon.com/Sequential-Flexible-Headlight-Exterior-Switchback/dp/B0BYP3QPZX/ref=asc_df_B0BYP3QPZX/?tag=hyprod-20&linkCode=df0&hvadid=674635769715&hvpos=&hvnetw=g&hvrand=9537676264531038382&hvpone=&hvptwo=&hvqmt=&hvdev=c&hvdvcmdl=&hvlocint=&hvlocphy=9018827&hvtargid=pla-2202780648448&mcid=9.

*Primary Examiner* — Sean P Gramling
(74) *Attorney, Agent, or Firm* — FOLEY & LARDNER LLP

(57) ABSTRACT

An apparatus can include a light fixture. The light fixture can be disposed between a first light of a vehicle and a second light of the vehicle. The light fixture can include a first segment having a first light source and a second segment having a second light source. The first segment can produce light with a first pattern via the first light source. The second segment can produce light with a second pattern via the second light source. The first pattern and the second pattern can indicate a vehicle status of the vehicle.

14 Claims, 14 Drawing Sheets

(51) Int. Cl.
*B60L 53/60* (2019.01)
*B60Q 1/26* (2006.01)

(52) U.S. Cl.
CPC ....... *B60L 2250/16* (2013.01); *B60L 2260/20* (2013.01); *B60Q 2900/30* (2013.01)

(56) References Cited

U.S. PATENT DOCUMENTS

| | | | |
|---|---|---|---|
| 9,121,566 B2 | 9/2015 | De Lamberterie | |
| 10,920,950 B1* | 2/2021 | Glickman | B60Q 3/30 |
| 11,208,029 B2 | 12/2021 | Spero | |
| 2021/0254806 A1* | 8/2021 | Choi | B60Q 1/28 |

* cited by examiner

APPARATUS WITH LIGHT FIXTURE

CROSS-REFERENCE TO RELATED PATENT APPLICATIONS

This application claims the benefit of and priority to U.S. Provisional Patent Application No. 63/553,325, filed on Feb. 14, 2024, the entirety of which is incorporated by reference herein.

INTRODUCTION

Vehicles can include light fixtures to produce light.

SUMMARY

This disclosure is generally related to one or more components of a vehicle. The components can include at least one apparatus. The apparatus can include at least light fixture. For example, the apparatus can include a first light fixture and a second light fixture. The light fixtures can include one or more light sources. For example, the light fixtures can include Light Emitting Diode (LED) strips. The light sources can produce light having one or more patterns. For example, the light sources can illuminate one or more segments or one or more portions of the light fixture. The light sources can produce light with one or more patterns. For example, the light sources can produce light with a first pattern or a second pattern. The patterns can indicate a vehicle status. For example, a first pattern can include illumination of light from a first segment of the light fixtures to a second segment of the light fixtures to indicate a State of Charge (SoC) of one or more batteries of the vehicle.

At least one aspect is directed to an apparatus. The apparatus can include a light fixture. The light fixture can be disposed between a first light of a vehicle and a second light of the vehicle. The light fixture can include a first segment having a first light source and a second segment having a second light source. The first segment can produce light with a first pattern via the first light source. The second segment can produce light with a second pattern via the second light source. The first pattern and the second pattern can indicate a vehicle status of the vehicle.

At least one aspect is directed to a vehicle. The vehicle can include an apparatus. The apparatus can include a light fixture. The light fixture can be disposed between a first light of the vehicle and a second light of the vehicle. The light fixture can include a first segment having a first light source and a second segment having a second light source. The first segment can, responsive to one or more first signals, produce light with a first pattern via the first light source. The second segment can, responsive to one or more second signals, produce light with a second pattern via the second light source. The first pattern and the second pattern can indicate a vehicle status of the vehicle.

At least one aspect is directed to a method. The method can include disposing a light fixture of an apparatus between a first headlight of a vehicle and a second headlight of the vehicle. The light fixture can include a first segment having a first light source and a second segment having a second light source. The method can also include receiving, by the first segment, one or more first signals to cause the first segment to produce light with a first pattern via the first light source. The method can also include receiving, by the second segment, one or more second signals to cause the second segment to produce light with a second pattern via the second light source. The first pattern and the second pattern can indicate a vehicle status of the vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of an apparatus having one or more light fixtures to indicate one or more vehicle statuses of a vehicle. The various concepts introduced above and discussed in greater detail below may be implemented in any of numerous ways.

The present disclosure is directed to systems and methods of one or more components for a vehicle. The components can include an apparatus. The apparatus can include one or more light fixtures including light sources to produce light having one or more patterns. For example, the light sources can illuminate one or more segments of an apparatus to indicate a vehicle status. As another example, the light sources can produce light that originates at a first point of a vehicle. The light fixture can include one or more segments. For example, the light fixture can include a first segment and a second segment. The segments can receive one or more instructions. For example, the segments can receive instructions to illuminate the light sources. As another example, the segments can receive instructions to halt a production of light.

The disclosed solutions have a technical advantage of providing the apparatus that includes the light fixture to dispose between one or more lights of a vehicle (e.g., headlights, side lights, rear lights, cabin lights, interior lights, exterior lights, or any other vehicle lights or combinations thereof) to provide one or more vehicle statuses without an operator of the vehicle having to enter into the vehicle. For example, the vehicle can detect a presence of an operator of the vehicle and the vehicle can control the light sources to produce light without the operator within the vehicle. Systems and methods of the present technical solution also include providing light fixture with the light sources to receive one or more instructions. The instructions can define or dictate one or more patterns produced by the light sources and as such can provide an operator with flexibility or modularity as to light patterns that can be produced by the light sources.

Figure 1:
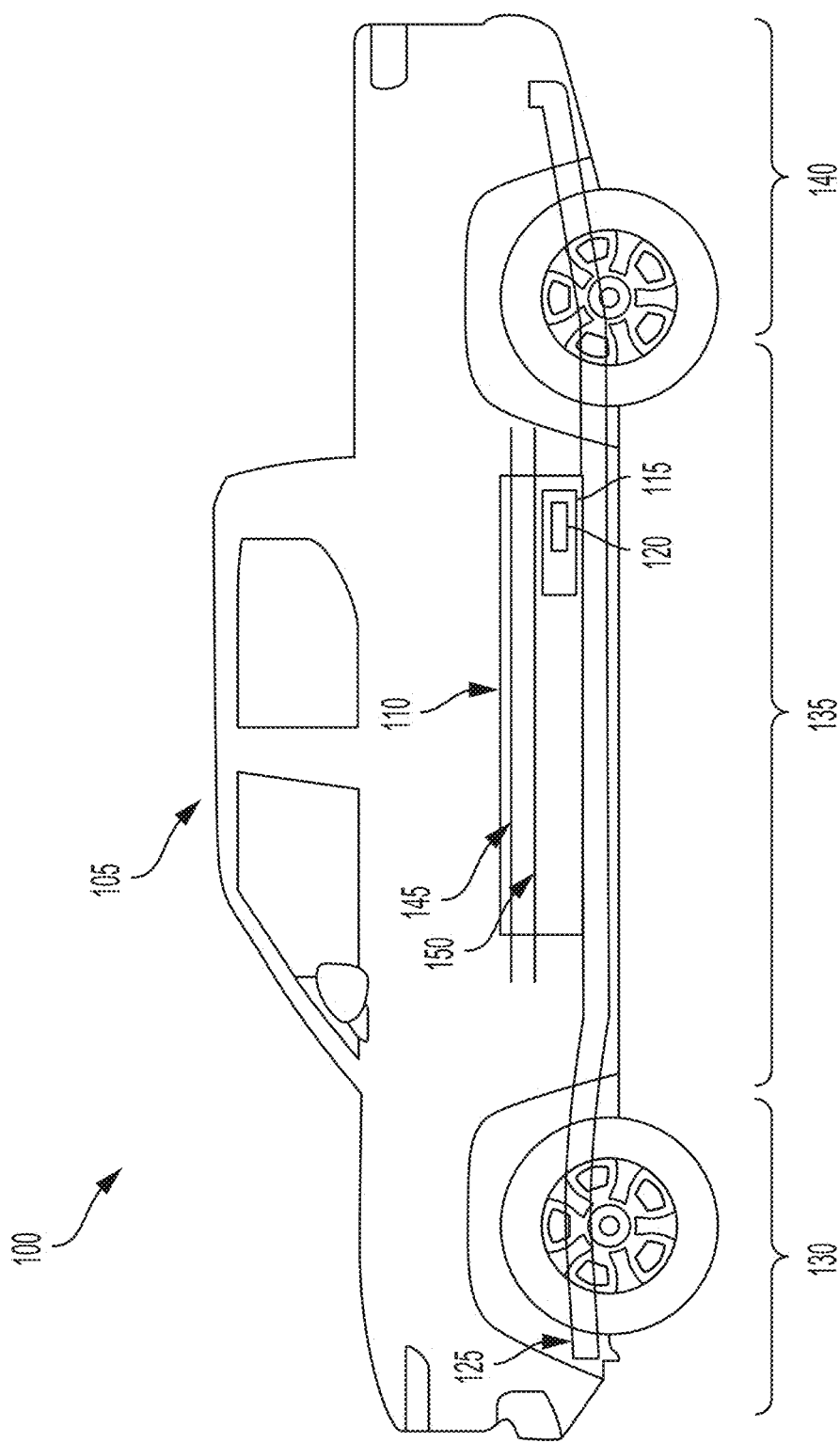
FIG. 1 depicts an electric vehicle, in accordance with an implementation.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
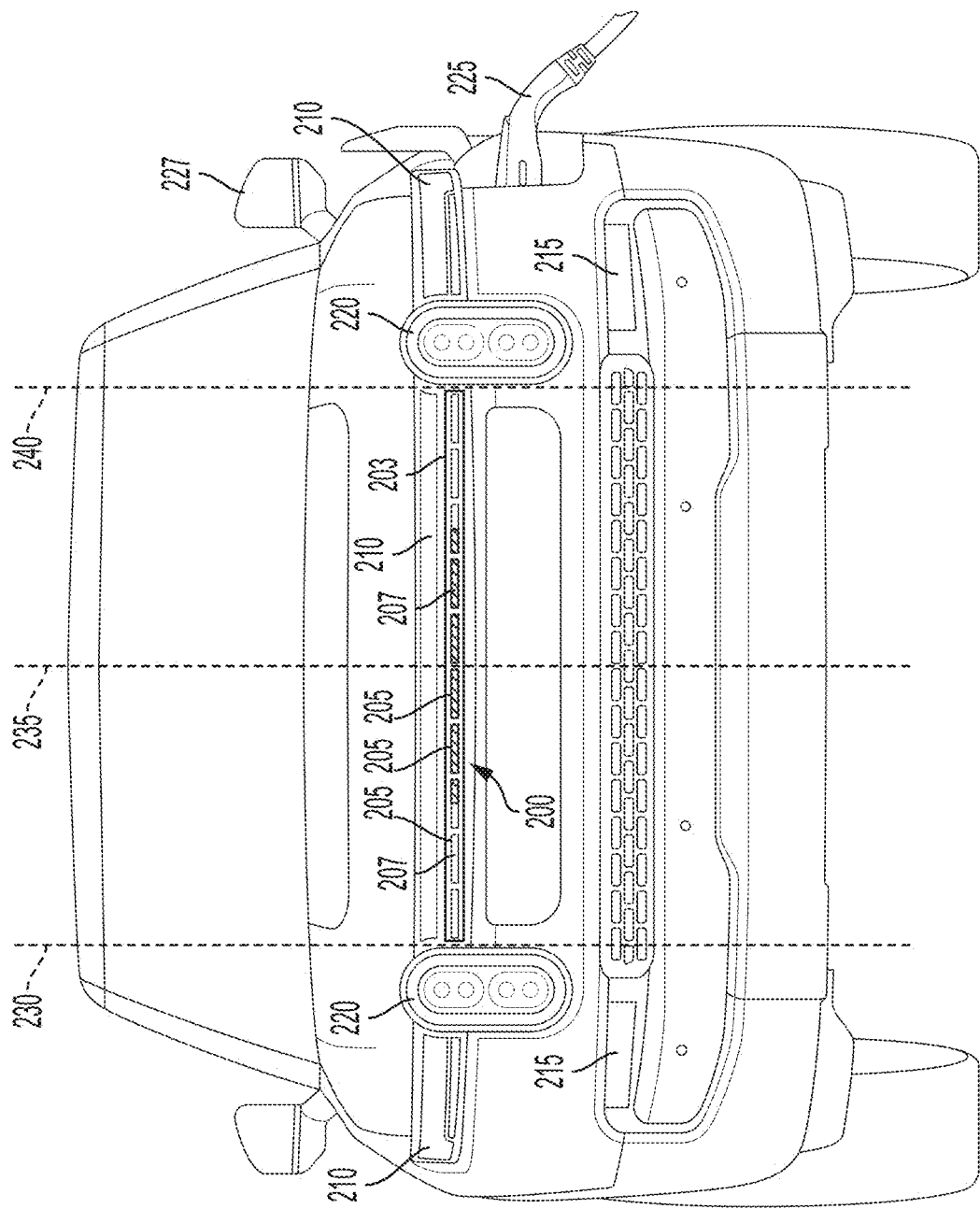
FIG. 2 depicts a front view of the vehicle illustrated in FIG. 1 including an apparatus, in accordance with an implementation.

FIG. 2 depicts a perspective view of the vehicle 105. The vehicle 105 can include an apparatus 200, at least one lightbar 210, at least one light 215, at least one headlight 220, at least one charging cord 225, and at least one mirror 227. For example, the apparatus 200 can be included in a front panel of the vehicle 105. As another example, the apparatus 200 can be included in a rear panel of the vehicle 105. As even another example, the apparatus 200 can be included in a door of the vehicle 105. The vehicle 105 or one or more components thereof can define and/or establish one or more sections or portions. For example, as shown in FIG. 2, the vehicle 105 can define a section 230, a section 235, and a section 240. To continue this example, the section 230 can refer to or include a left section, the section 235 can refer to or include a middle section or center point, and the section 240 can refer to or include a right section.

The apparatus 200 can include at least one light fixture 203. The light fixture 203 can include at least one segment 205 or section 205. For example, the light fixture 203 can include a first segment 205 and a second segment 205. The segments 205 can include at least one light source 207. For example, the segments 205 can include LED strips. The light fixture 203 can be included with the vehicle 105. For example, the light fixture 203 can be disposed between a first headlight 220 and a second headlight 220. To continue this example, the light fixture 203 can be located, positioned, and/or placed between the headlights 220 to dispose the light fixture 203 between the headlights 220.

The segments 205 can receive one or more signals (e.g., instructions or a provision of electrical power). For example, the segments 205 can receive signals from a controller of the vehicle 105. As another example, the segments 205 can receive signals from an infotainment system of the vehicle 105. As shown in FIG. 2, the light fixture 203 is shown to include ten segments 205. However, the light fixture 203 can include different numbers of segments 205. For example, the light fixture 203 can include five segments 205. As another example, the light fixture 203 can include 11 segments 205.

A controller (e.g., a processor and memory) can send one or more signals or instructions to the segments 205. For example, the controller can send a first signal to a first segment 205 and a second segment 205. The signals can be the same signals or different signals. The signals can include multiple signals. For example, the controller can send one or more first signals to a first segment 205 and the controller can send one or more second signals to a second segment 205. The signals can control the light sources 207. For example, the controller can send a first signal to cause the light source 207 to produce light. As another example, the controller can pause the first signal or send a second signal to cause the light source to stop the production of light. The signals or instructions described herein can include control signals (e.g., a signal to turn on, a signal to turn off, etc.) The signals or instructions can also include transmission of electrical current, electrical voltage, or electrical power that, when received by the light fixture 203, causes the light fixture 203 to produce light.

The segments 205 can receive one or more instructions to cause the light sources 207 to produce light. For example, a first segment 205 can receive a first instruction and a second segment 205 can receive a second instruction. The first instruction and the second instruction can be the same instruction or different instructions. For example, the first segment 205 and the second segment 205 can receive the same signal or different signals. The instructions can cause the light sources 207 to produce light. For example, the first segment 205 can receive a first instruction to cause a first light source 207 to produce light. To continue this example, the first instruction can cause the first segment 205 to activate (e.g., turn on) the first light source 207 to produce light. Stated otherwise, the first instruction can cause the first segment 205 to provide power to the first light source 207 to cause the first light source 207 to produce light.

The light sources 207 can produce light having one or more patterns. For example, a first light source 207 can produce light with a first pattern and a second light source 207 can produce light with a second pattern. As another example, one or more light sources 207 can produce light with one or more patterns. As even another example, the first light source 207 and the second light source 207 can produce a third pattern. To continue this example, the first segment 205 and the second segment 205 can receive a similar instruction (e.g., a third instruction) which can cause the first light source 207 and the second light source 207 to produce a similar pattern (e.g., the third pattern). The patterns can include at least one of a brightness of light produced, a direction of the light, strobing lights, colored lights, flashing lights, pulsing lights, a flow of light, or other possible patterns. For example, a first pattern can include light traveling from the section 230 to the section 235. To continue this example, the light can travel along one or more segments 205 (e.g., light can begin at a first segment 205 and travel to one or more second segments 205). As described herein, light traveling can include a production of light by a first light source 207 at a first point in time, a production of light by a second light source 207 at a second point in time, and a halt in the production of light by the first light source 207 at the second point in time. The production of light by the first light source 207 and the production of light by the second light source 207 can give an appearance or a look of light traveling from a first segment 205 to a second segment 205. As another example, production of light can originate at one or more segments 205 and then travel or move to one or more second segments by turning on or off one or more light sources 207.

The patterns can indicate one or more statuses. For example, the patterns can include a vehicle status. The vehicle status can include at least one of a state of charge (SoC) of the batteries 115, a charging status of the batteries 115, an autonomous drive mode of the vehicle 105, a predetermined color pattern, an unlocked state of the vehicle 105, or a locked state of the vehicle. For example, the light sources 207 can turn on and off to create an appearance of light traveling from a leftmost light source 207 to a rightmost light source 207. As another example, the ten light sources 207 (as shown in FIG. 2 can each represent 10 percent battery charge). To continue this example, illumination of a first leftmost light source 207 and a second leftmost light source 207 can indicate that the batteries 115 have a SoC of 20 percent. To continue this example, the light sources 207 can produce light to travel, while illuminating the first leftmost light source 207 and the second leftmost light source 207, from the first leftmost light source 207 to a rightmost light source 207 to indicate that the batteries 115 are charging.

While some example, described herein have included light traveling in one or more directions, these example are not limiting in any way. For example, light can travel from (e.g., originate) from one or more points along the vehicle 105 and travel to one or more second points along the vehicle 105.

The segments 205 can receive the instructions responsive to a detection of at least one of a fob of the vehicle, a key of the vehicle, a user device associated with the vehicle, or a selection of a selectable element displayed on a user interface. For example, the first segment 205 can receive a first instructions responsive to a computing device of the vehicle 105 detecting a fob of the vehicle 105 (e.g., the fob is within a given range or geofence of the vehicle 105). As another example, the first segment 205 can receive a first instruction responsive to a computing device of the vehicle 105 receiving a signal to unlock the vehicle 105. As even another example, the first segment 205 can receive a first instruction responsive to a computing device of the vehicle 105 detecting a selection of a lock vehicle button on a user interface.

The light sources 207 can produce light at one or more points in time. For example, a first light source 207 can produce light with a first pattern at a first point in time. To continue this example, the first light source 207 can produce light with a second pattern at a second point in time. The light sources 207 can be controlled together or separately. For example, the light segments 205 can receive an instruction which cause the light sources 207 to produce light having a first pattern. As another example, the segments 205 can receive a first instruction and a second instructions which caused the light sources 207 to produce light with different patterns. As even another example, a first light source can produce light with the first pattern at a first point in time can produce light with the second pattern at a second point in time (e.g., at different points in time).

The patterns can include light traveling from one or more points of the vehicle 105. For example, the first pattern can include light traveling from a first point of the vehicle 105 to a second point of the vehicle 105. Light traveling from the first point of the vehicle 105 can include light traveling from a portion of the vehicle proximate to at least one of the sections (e.g., the section 230, the section 235, or the section 240). For example, light can originate a leftmost portion of a first segment 205 and travel to a rightmost portion of the first segment 205. As another example, light can originate at a center segment 205 and travel to one or more of a leftmost segment 205 and a rightmost segment 205 (e.g., a lateral point of the vehicle 105).

The light sources 207 can produce light having one or more colors. For example, the first light source 207 can include a Red Green Blue (RGB) LED that can produce light having one or more colors. As another example, the first light source 207 can produce light that includes a red color (e.g., a first color) and the second light source 207 can produce light that includes a green color (e.g., a second color). The light sources 207 can produce light having one or more colors based on the instructions received by the segments 205. For example, a first instruction can include information to cause the first light source 207 to produce light with a blue color and the second instruction can include information to cause the second light source 207 to produce light with a yellow color. The light sources 207 can produce light that has a color different than a color of light produced by the headlights 220. For example, the headlights 220 can produce light having a white color and the light sources 207 can produce light having a blue color (e.g., a color different than white).

Figure 3:
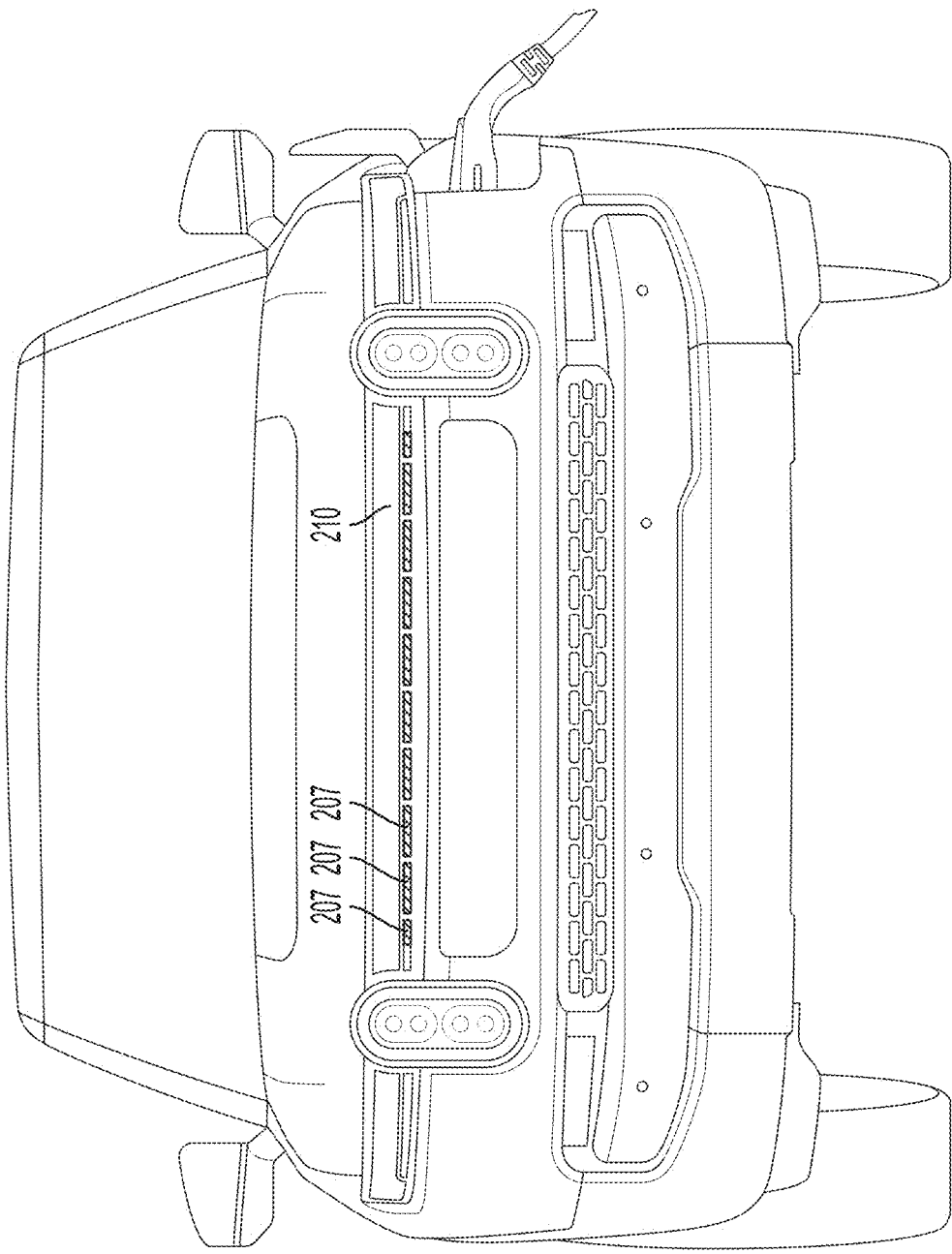
FIG. 3 depicts a front view of the vehicle illustrated in FIG. 1 including an apparatus, in accordance with an implementation.
Figure 4:
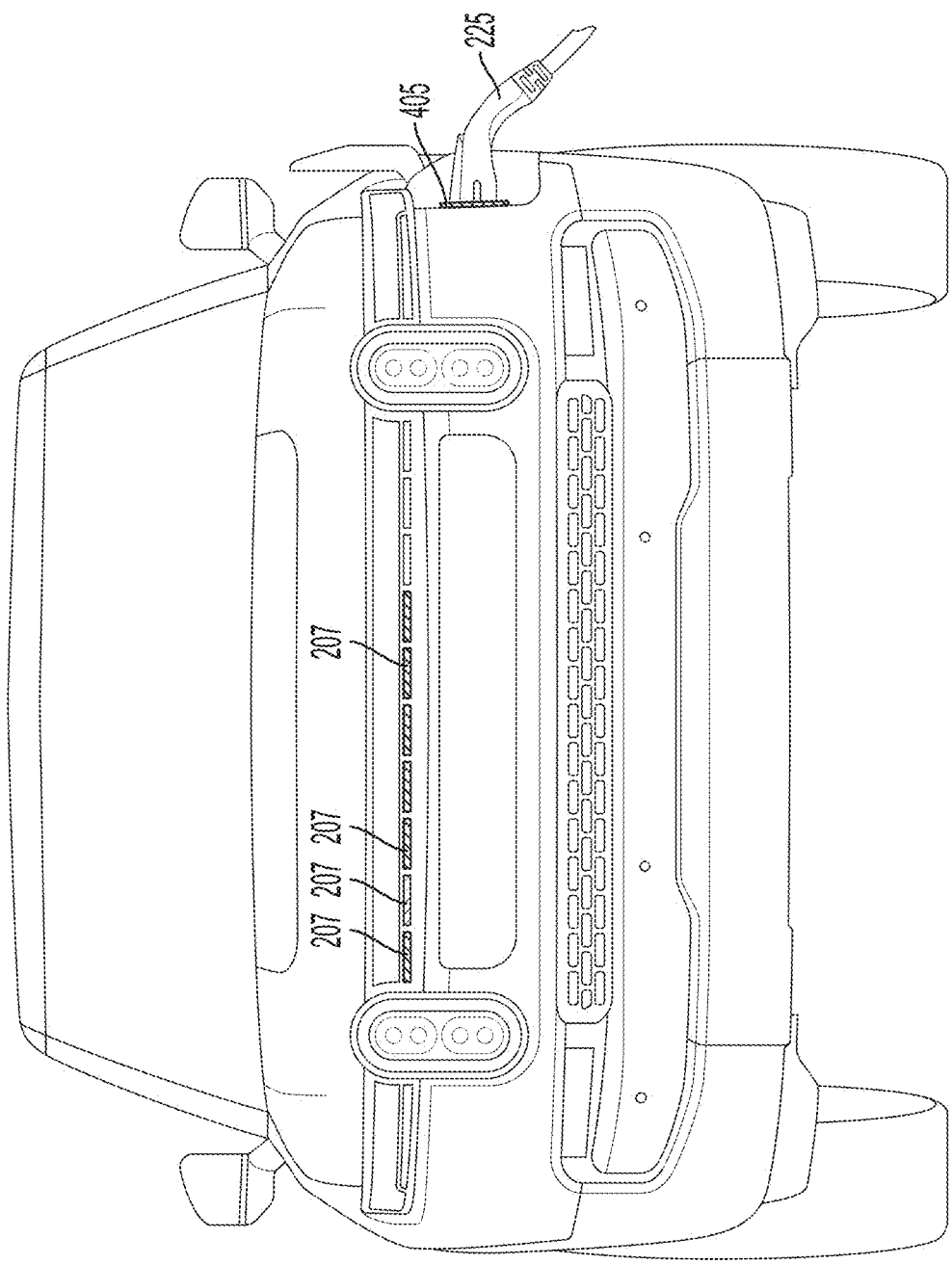
FIG. 4 depicts a front view of the vehicle illustrated in FIG. 1 including an apparatus, in accordance with an implementation.
Figure 5:
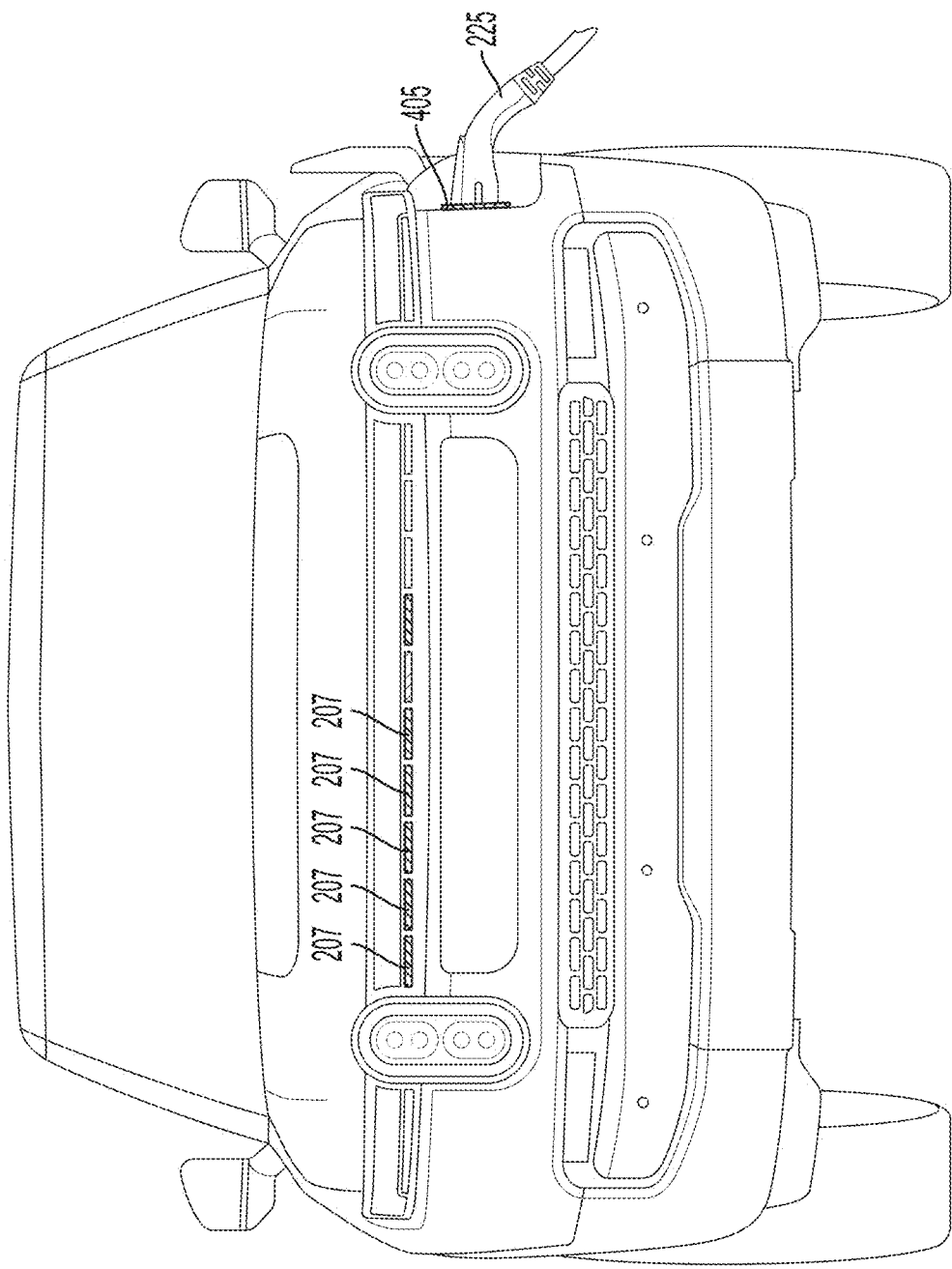
FIG. 5 depicts a front view of the vehicle illustrated in FIG. 1 including an apparatus, in accordance with an implementation.

FIGS. 3, 4, and 5 depict front views of the vehicle 105. The vehicle 105 can include apparatus 200. For example, the apparatus 200 is shown to be included in a front panel of the vehicle 105. As shown in FIG. 3, relative to FIG. 2, light produced by the light sources 207 is shown to have traveled from a center point of the vehicle to a lateral point of the vehicle 105 (e.g., light started at a center of the vehicle and traveled outwards).

FIG. 4 depicts an example of the light sources 207 producing light to indicate an SoC of the batteries 115. For example, a second leftmost light source 207 is shown to be producing light with a brightness that is less than or different than the other six light sources 207 that are shown to be producing light. In this example, the second leftmost light source 207 having light with a different brightness can indicate that the batteries 115 have a SoC of 20 percent. To continue this example, light flowing from a first leftmost light source 207 to a rightmost light source 207 can indicate that the batteries 115 are being charged.

The charging cord 225 can include at least one light fixture 405. The light fixtures 405 can include the light fixture 203. For example, the light fixtures 405 can include the light sources 207. The light fixtures 405 can at least partially surround an external surface of the charging cord 225. For example, the light fixture 405 can be disposed on the external surface of the charging cord 225 and the light fixture can extend along the external surface of the charging cord. The light fixtures 405 can include the segments 205. For example, the light fixtures 405 can include a first segment 205 and a second segments 205. The segments 205 can receive instructions to cause the light sources 207 of the light fixtures 405 to produce light with one or more patterns. The light produced by the light sources 207 of the light fixtures 405 can match and/or coordinate with light produced by the light sources 207 of the light fixture 203. For example, light sources 207 of the light fixture 405 can produce light with a pattern that matches a pattern of light produced by the light sources 207 of the light fixture 203.

Figure 6:
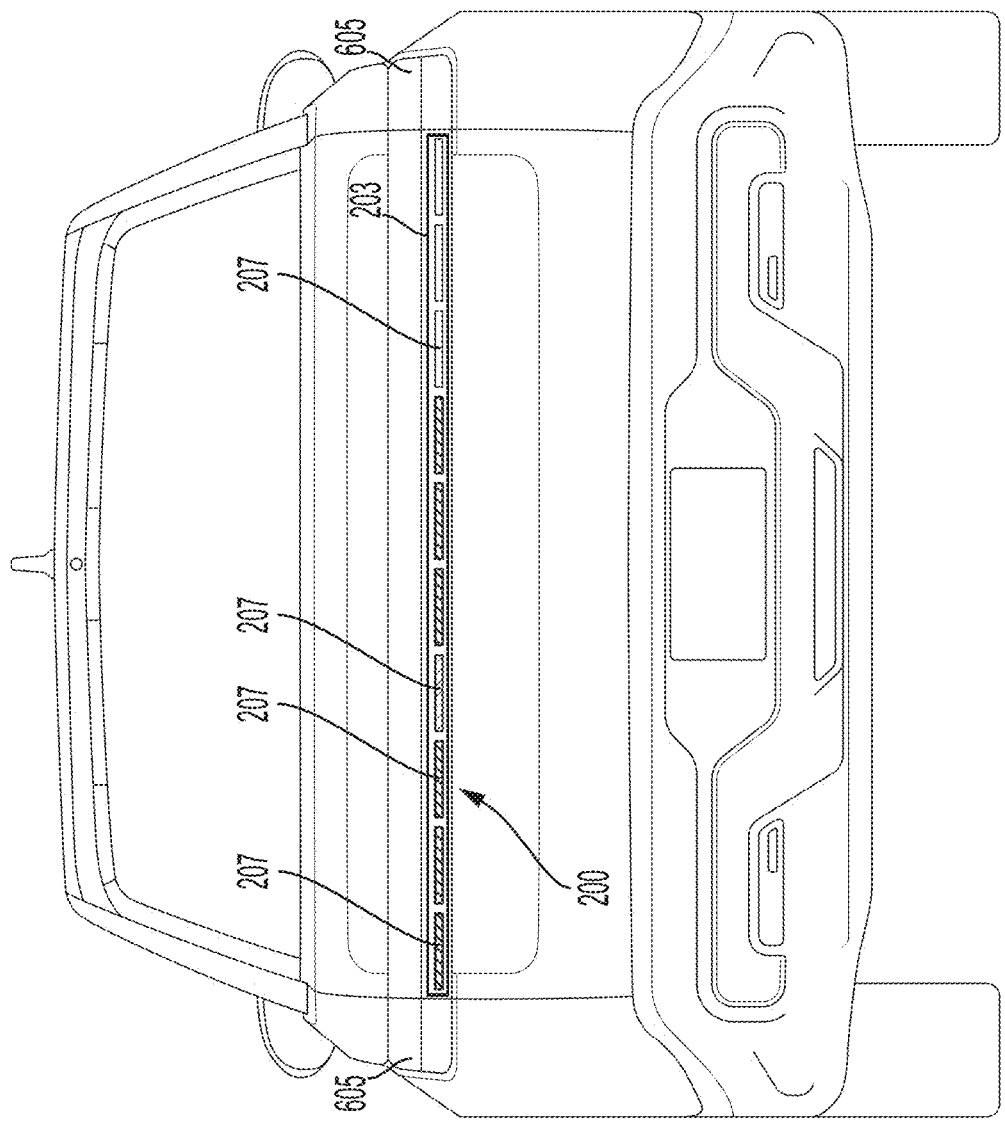
FIG. 6 depicts a rear view of the vehicle illustrated in FIG. 1 including an apparatus, in accordance with an implementation.
Figure 7:
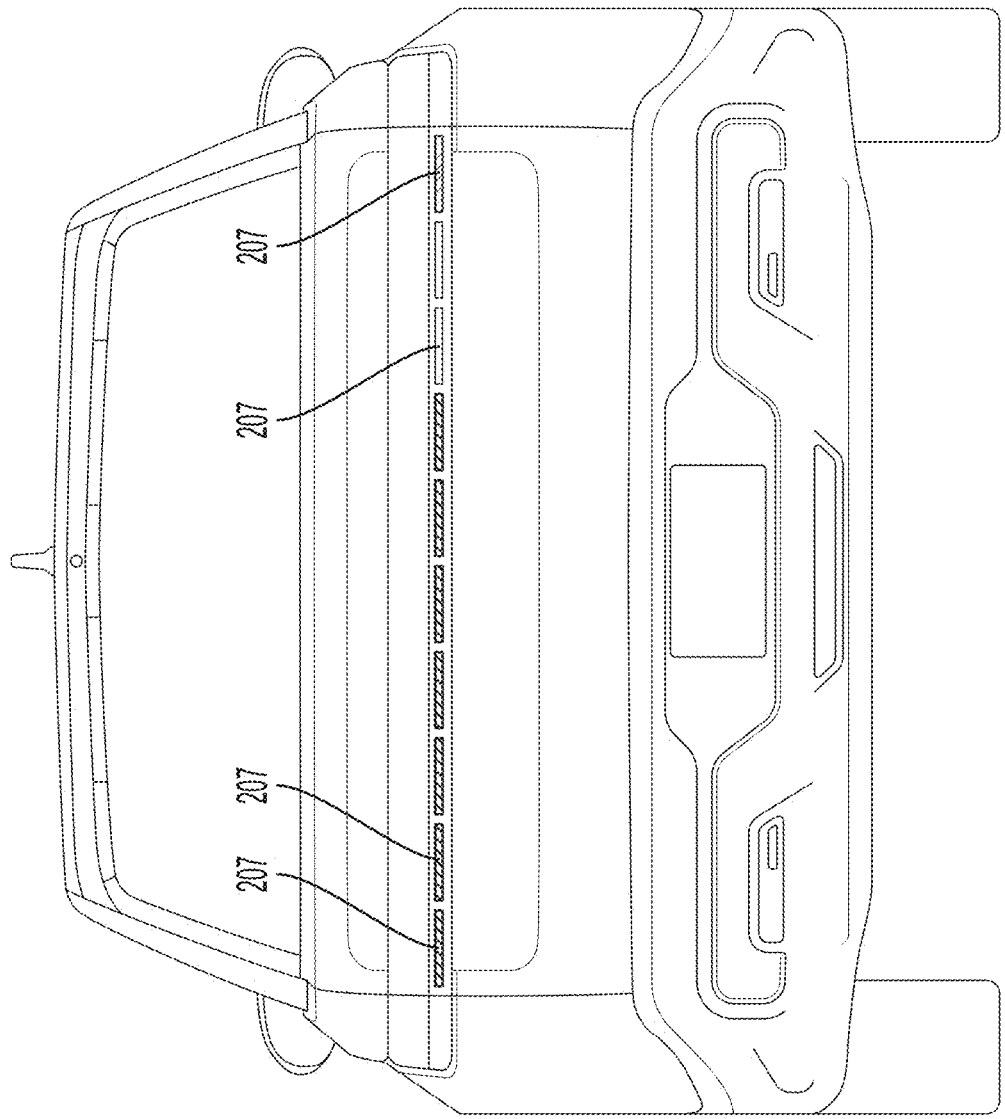
FIG. 7 depicts a rear view of the vehicle illustrated in FIG. 1 including an apparatus, in accordance with an implementation.

FIGS. 6 and 7 depict rear views of the vehicle 105. The vehicle 105 can include the apparatus 200. For example, the apparatus 200 can be included in a rear gate of the vehicle. As another example, the vehicle 105 can include a first apparatus 200 included in a front panel of the vehicle 105 and a second apparatus 200 included in the rear gate of the vehicle 105. The second apparatus 200 can include a second light fixture 203 disposed between one or more rear lights of the vehicle 105. For example, the second light fixture 203 can be disposed between a first rear light 605 and a second rear light 605. The rear lights 605 of the vehicle 105 can include at least one of a rear lightbar, brake lights, or flashers. The second light fixture 203 can include one or more segments 205. The segments 205 can receive one or more instructions. For example, a light fixture 203 disposed in a front panel of the vehicle 105 and a light fixture 203 disposed in a rear gate of the vehicle 105 can receive similar instructions. The light fixtures 203 receiving similar instructions can cause the light sources 207, located at the front of the vehicle 105, to produce light with a pattern that is similar to light produced by light sources 207 located at the rear of the vehicle.

Figure 8:
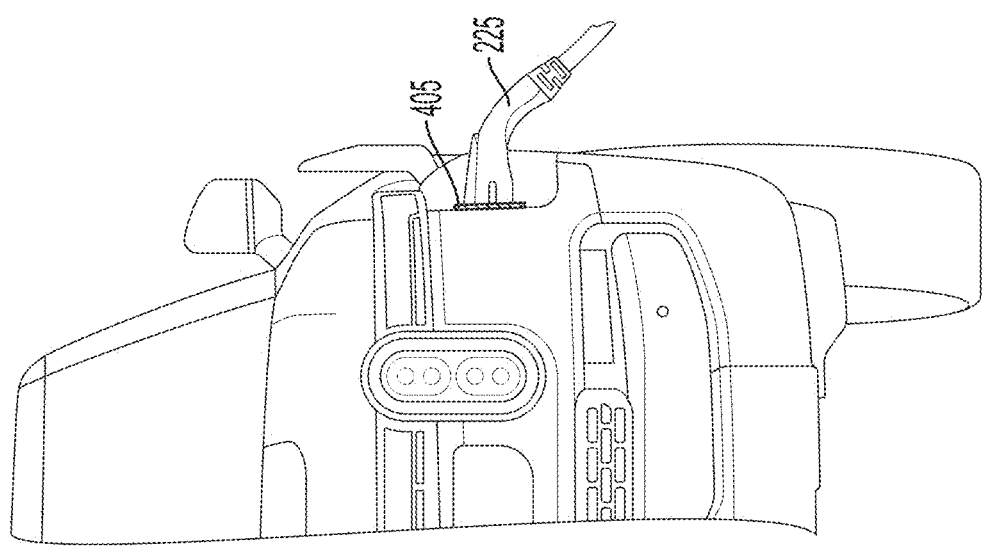
FIG. 8 depicts a perspective view of the vehicle illustrated in FIG. 1 including an apparatus, in accordance with an implementation.

FIG. 8 depicts a perspective view of the vehicle 105. The vehicle 105 can include a port or slot to receive the charging cord 225. For example, the port can include one or more openings to receive one or prongs of the charging cord 225. The vehicle 105 can include the light fixture 405. For example, the light fixture 405 can be coupled with a panel of the vehicle. As another example, a charging compartment of the vehicle 105 can include the light fixture 405.

Figure 9:
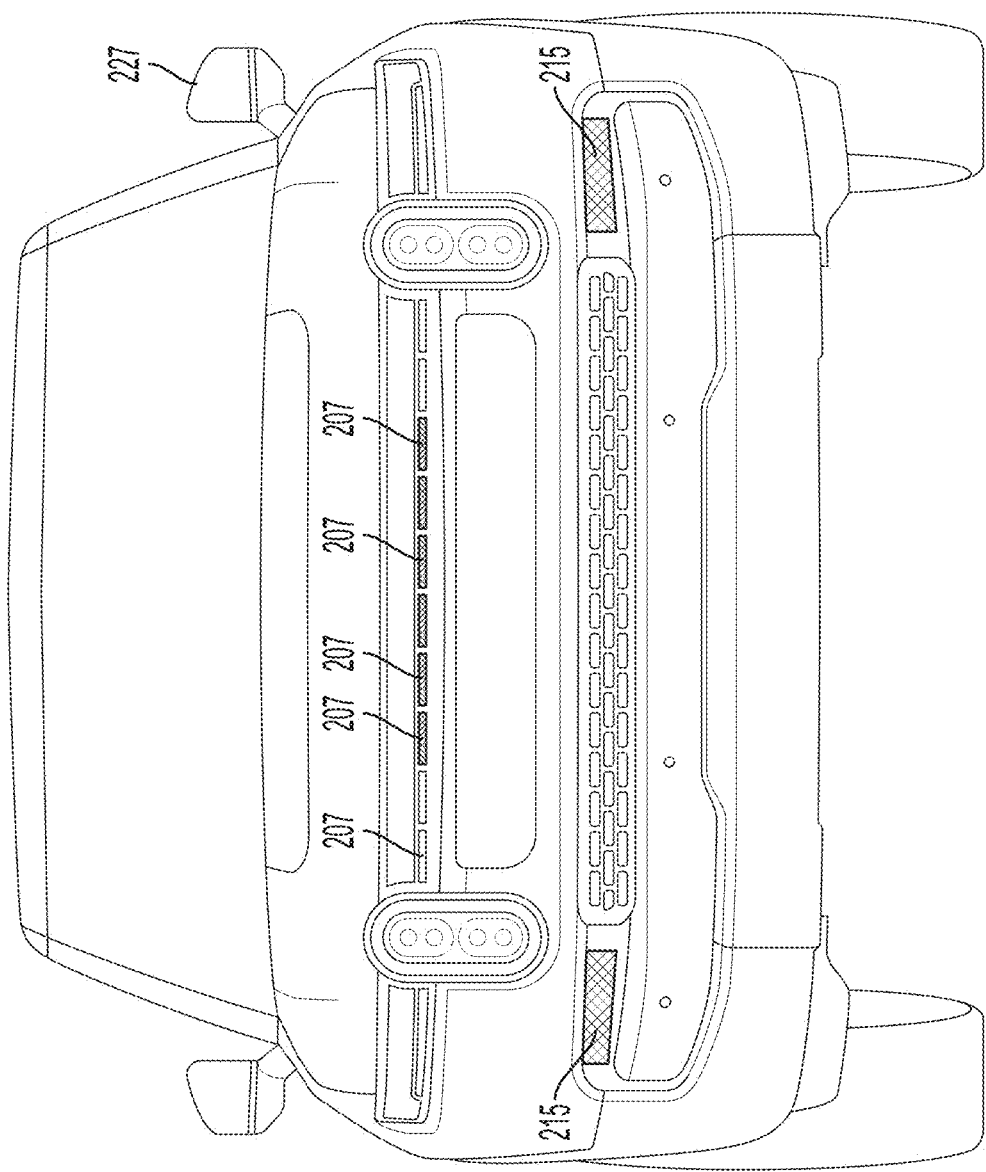
FIG. 9 depicts a front view of the vehicle illustrated in FIG. 1 including an apparatus, in accordance with an implementation.

FIG. 9 depicts a front view of the vehicle 105. FIG. 9 depicts an example of the light sources 207 producing light originating from a center point of the vehicle 105. As shown in FIG. 9, the lights 215 are producing light in unison with the light sources 207 (e.g., the lights 215 and the light sources 207 are producing light at the same time). The light produced by the light sources 207 and the light produced by the lights 215 can be different. For example, the light sources 207 and the lights 215 can produce light having different colors. As another example, the light sources 207 and the lights 215 can produce light with different colors to indicate one or more vehicle statuses. The lights 215 can include turn signals or blinkers. For example, a first light 215 can flash or illuminate to indicate a change in direction of the vehicle 105 (e.g., indicate that the vehicle 105 is turning left or turning right).

The light pattern shown in FIG. 9 can be initiated responsive to detection of a key fob of the vehicle 105. The light pattern shown in FIG. 9 can refer to or include a welcome or greeting pattern (e.g., a light pattern that is produced as an operator of the vehicle 105 approaches the vehicle 105). The light pattern shown in FIG. 9 can also refer to or include a departure or exit pattern (e.g., a light pattern that is produced as an operator the vehicle 105 departs or moves away from the vehicle 105).

Figure 10:
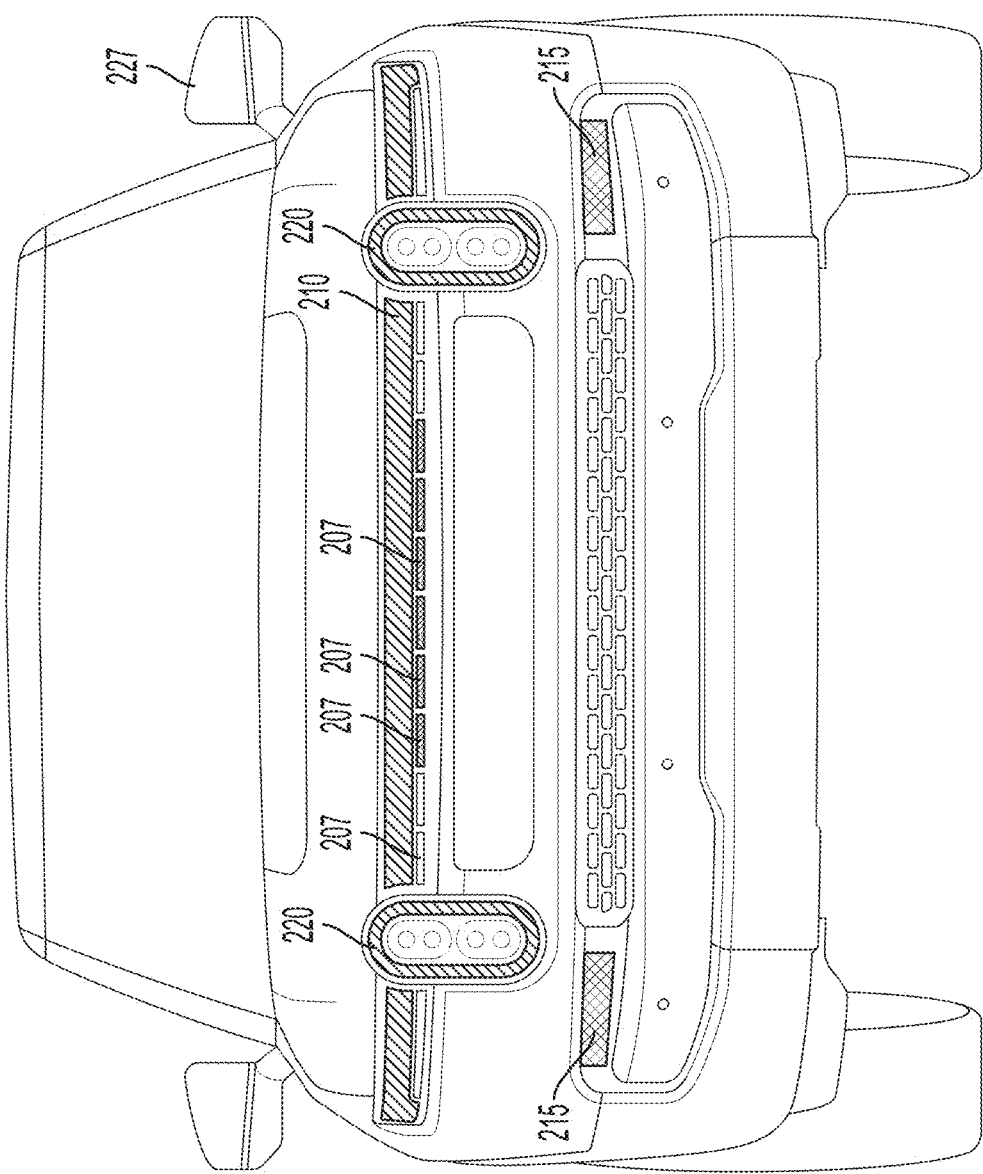
FIG. 10 depicts a front view of the vehicle illustrated in FIG. 1 including an apparatus, in accordance with an implementation.

FIG. 10 depicts a front view of the vehicle 105. FIG. 10 depicts an example of the light sources 207 producing light in unison with the lightbar 210 and the headlights 220. For example, the light pattern, as shown in FIG. 10, can be a continuation or a transition from the light pattern shown in FIG. 9. Stated otherwise, the light pattern, as shown in FIG. 9, can occur at a first point in time and the light pattern, as shown in FIG. 10, can occur at a second point in time that is subsequent to the first point in time (e.g., after). As shown in FIG. 10, relative to FIG. 9, the mirrors 227 have moved from a stowed or closed position to a deployed or open position. The movement of the mirrors 227 (e.g., from the stowed to the deployed position) can occur in unison with the light pattern shown in FIG. 9 or FIG. 10. For example, as the lights sources 207 begin to produce the light pattern, as shown in FIG. 9, the mirrors 227 can begin to move from the collapsed position, as shown in FIG. 9, to the deployed position as shown in FIG. 10.

Figure 11A:
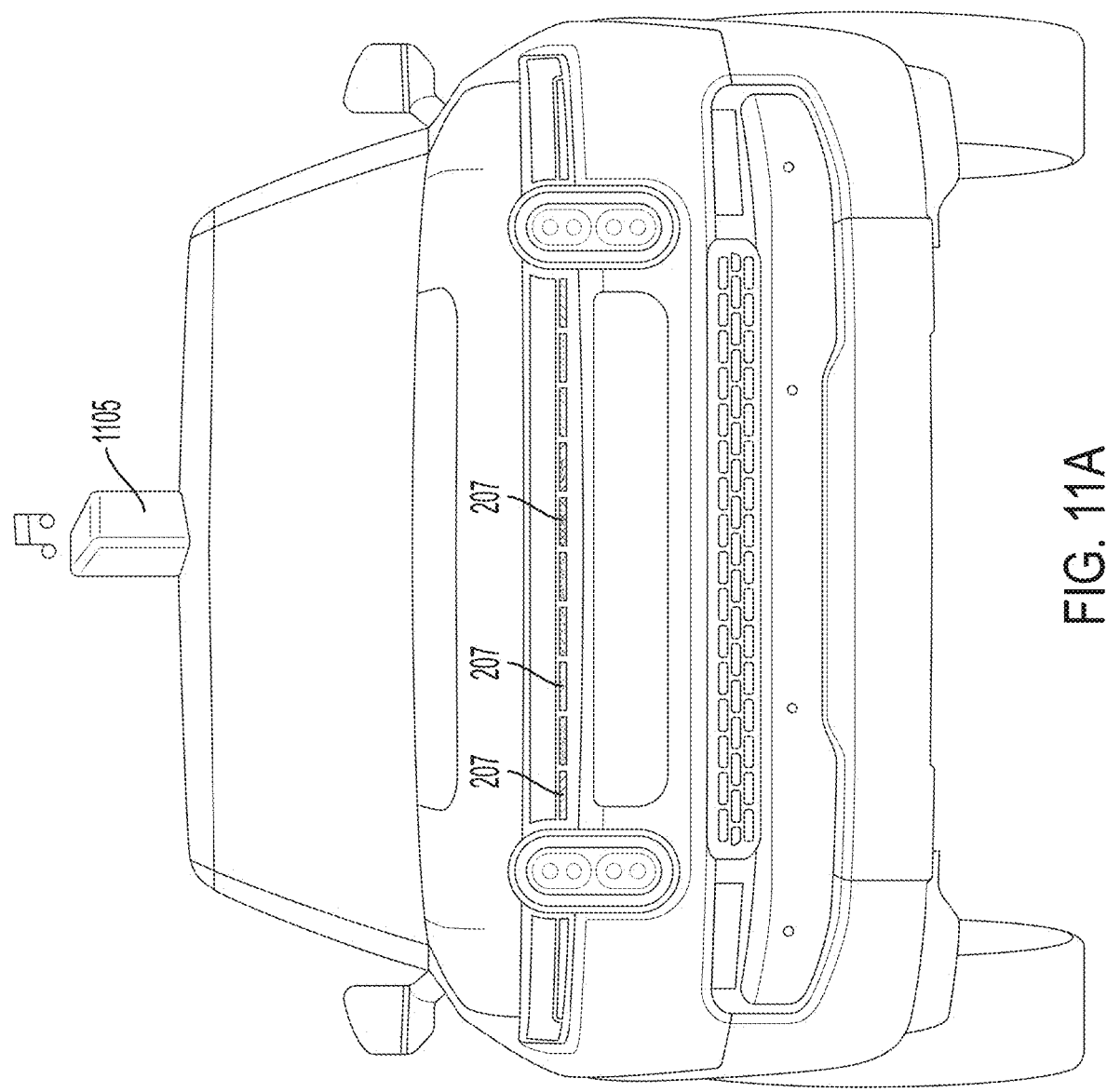
FIG. 11A depicts a front view of the vehicle illustrated in FIG. 1 including an apparatus, in accordance with an implementation.

FIG. 11A depicts a front view of the vehicle 105. The vehicle 105 can include at least one accessory 1105 or device 1105. For example, the accessories 1105 can be provided with the vehicle 105. As another example, the accessories 1105 can pair with or connect to the vehicle 105. The accessory 1105 is shown as a speaker in FIG. 11. The accessory 1105 can communicate with the light fixture 203. For example, the accessory 1105 and the light fixture 203 can transmit one or more signals to one another. As another example, the accessory 1105 can receive one or more instructions similar to instructions received by the light fixture 203. The light sources 207 can produce light patterns to align with or correspond to aspect of the accessory 1105. For example, the light sources 207 can produce light patterns to align with music that is emitted or produced by the accessory 1105. FIG. 11 depicts an example of the light sources 207 producing light with a light pattern that aligns with the accessory 1105. The light pattern, as shown in FIG. 11, can refer to or include a music mode or a music pattern.

The light patterns described herein can refer to or include at least one of a camp mode, a night vision mode, an alarm mode, a roadside mode, an autonomous driving mode, one or more easter eggs (e.g., lights that correspond to one or more cultural references), a Halloween mode, a holiday mode, a camp speaker mode, a first responder mode, a service mode, a software update mode, a plugged in mode, or a turn signal mode.

The light patterns can be updated, adjusted, modified, or changed. For example, the light patterns can be updated by one or more over the air (OTA) updates. The OTA updates can include replacing, adding, removing, updating, adjusting, changing, combining, or modifying the light patterns. For example, prior to an OTA update the light sources 207 can produce light having red and green flashing light. To continue this example, the light sources 207 can produce light having purple and orange flashing lights based on the OTA update. As another example, the apparatus 200 or the vehicle 105 can include memory and/or more processors. To continue this example, the memory can store at least one light pattern and/or instructions to cause the light sources 207 to produce light with the light patterns.

The memory and processor can receive at least one over the air (OTA) update to update, adjust, modify, or change the light patterns stored in the memory. For example, prior to an OTA update the memory can maintain one or more first light patterns associated with a first holiday. To continue this example, the memory can, after the OTA update, maintain one or more second light patterns associated with a second holiday. Stated otherwise, the OTA update can replace the first light patterns with the second light patterns.

Figure 11B:
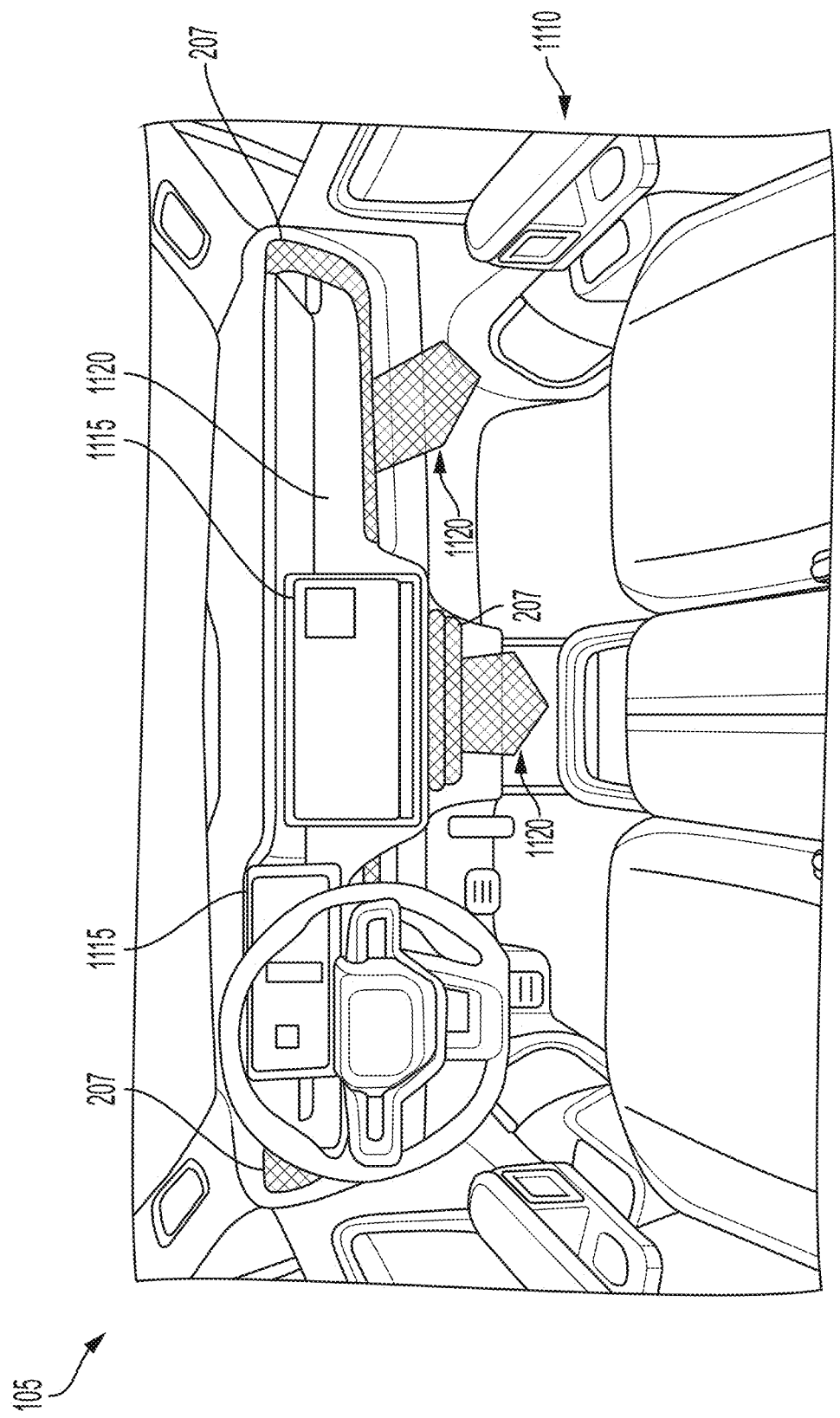
FIG. 11B depicts an internal view of a cabin of the vehicle illustrated in FIG. 1, in accordance with an implementation.

FIG. 11B depicts an internal view of a cabin 1110 of the vehicle 105. The cabin 1110 can include at least one display 1115 or screen 1115. For example, the cabin 1110 can include a first display 1115 that is housed behind a steering wheel of the vehicle 105. As another example, the cabin 1110 can include a second display 1115 that represents or houses an infotainment system of the vehicle 105. The cabin 1110 can include at least one dash 1120 or compartment 1120. The cabin 1110 can include the light sources 207. For example, a first light source 207 can be disposed proximate to or within the dash 1120. As another example, a second light source 207 can be disposed proximate to the infotainment system (e.g., the second display 1115). As another example, a third light source 207 can be disposed proximate to the steering wheel or the first display 1115. The light sources 207 can produce light to indicate a temperature or a temperature setting of the vehicle 105. For example, the light source 207 can produce light with a blue color to indicate that an air conditioning unit of the vehicle 105 is providing air 1120 that is cooled within the cabin 1110. As another example, the light sources 207 can produce light with a red color to indicate that a heating system of the vehicle 105 is providing air 1120 that is heated within the cabin 1110.

Figure 12:
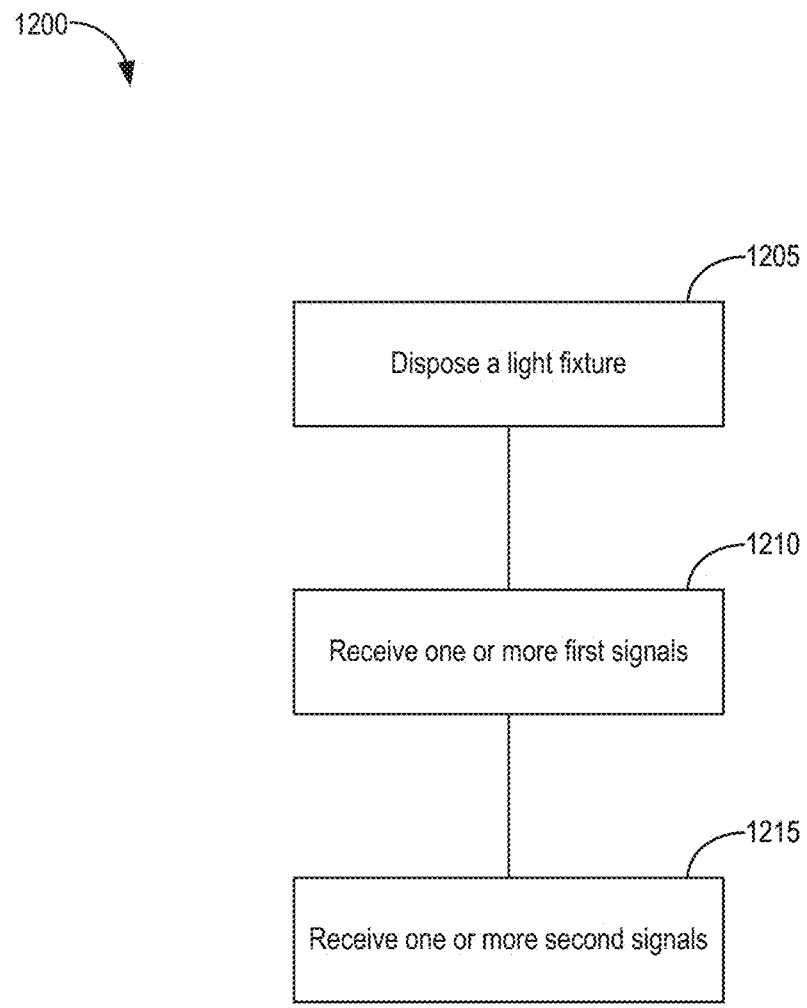
FIG. 12 depicts a flow diagram of a process to manufacture an apparatus, in accordance with an implementation.

FIG. 12 depicts a flow diagram of a process 1200 to manufacture an apparatus. The apparatus can include the apparatus 200. The apparatus 200 can include the light fixture 203. The apparatus 200 can be provided with or included with the vehicle 105. At act 1205, a light fixture can be disposed. For example, the light fixture 203 can be disposed between a first headlight 220 and a second headlight 220. The light fixture 203 can be disposed between the headlights by at least one of placing, locating, positioning, or otherwise situating the light fixture 203 between the headlights 220. For example, the light fixture 203 can be disposed in a front panel of the vehicle 105. The light fixture 203 can include the segments 205. The segments 205 can include the light sources 207. For example, a first segment 205 can include a first light source 207 and a second segment 205 can include a second light source 207.

At act 1210, one or more first signals can be received. For example, the first segment 205 can receive the one or more first signals. The one or more first signals can be instructions to cause a production of light. For example, the one or more first signals can cause the first light source 207 to produce light with a first pattern. At act 1215, one or more second signals can be received. For example, the second segment 205 can receive the one or more second signals. The one or more second signals instructions to produce light. For example, the one or more second signals can cause the second light source 207 to produce light with a second pattern. The first pattern and the second pattern can indicate a vehicle status of the vehicle 105. For example, the first pattern and the second pattern can indicate a SoC of the batteries 115 of the vehicle 105. As another example, the first pattern and the second pattern can indicate a drive mode of the vehicle 105.

Figure 13:
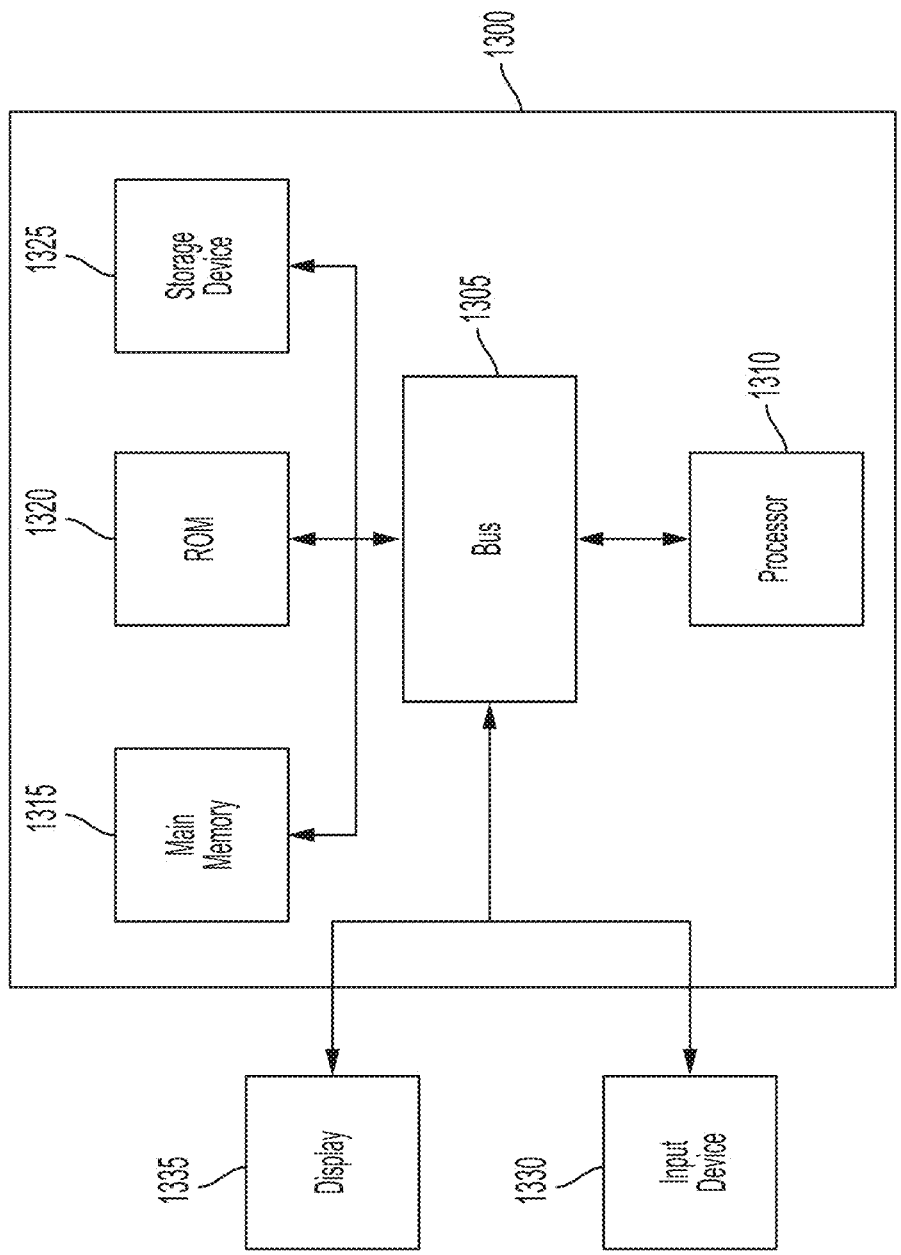
FIG. 13 is a block diagram illustrating an architecture for a computer system that can be employed to implement elements of the systems and methods described and illustrated herein.

FIG. 13 depicts an example block diagram of an example computer system 1300. The computer system or computing device 1300 can include or be used to implement a data processing system or its components. The computing system 1300 includes at least one bus 1305 or other communication component for communicating information and at least one processor 1310 or processing circuit coupled to the bus 1305 for processing information. The computing system 1300 can also include one or more processors 1310 or processing circuits coupled to the bus for processing information. The computing system 1300 also includes at least one main memory 1315, such as a random access memory (RAM) or other dynamic storage device, coupled to the bus 1305 for storing information, and instructions to be executed by the processor 1310. The main memory 1315 can be used for storing information during execution of instructions by the processor 1310. The computing system 1300 may further include at least one read only memory (ROM) 1320 or other static storage device coupled to the bus 1305 for storing static information and instructions for the processor 1310. A storage device 1325, such as a solid state device, magnetic disk or optical disk, can be coupled to the bus 1305 to persistently store information and instructions.

The computing system 1300 may be coupled via the bus 1305 to a display 1335, such as a liquid crystal display, or active matrix display, for displaying information to a user such as a driver of the electric vehicle 105 or other end user. An input device 1330, such as a keyboard or voice interface may be coupled to the bus 1305 for communicating information and commands to the processor 1310. The input device 1330 can include a touch screen display 1335. The input device 1330 can also include a cursor control, such as a mouse, a trackball, or cursor direction keys, for communicating direction information and command selections to the processor 1310 and for controlling cursor movement on the display 1335.

The processes, systems and methods described herein can be implemented by the computing system 1300 in response to the processor 1310 executing an arrangement of instructions contained in main memory 1315. For example, the computing system 1300 can be in communication with the light fixture 203. To continue this example, the computing system 1300 can transmit one or more instructions to the light fixture 203. In this example, the computing system 1300 can detect at least one of a fob of the vehicle 105, a key of the vehicle 105, a user device associated with the vehicle 105, or a selection of a selectable element displayed on a user interface. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. Hard-wired circuitry can be used in place of or in combination with software instructions together with the systems and methods described herein. Systems and methods described herein are not limited to any specific combination of hardware circuitry and software.

Although an example computing system has been described in FIG. 13, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
 a light fixture to dispose within a central portion of a vehicle, the central portion of the vehicle (i) positioned between a first light source of the vehicle and a second light source of the vehicle and (ii) at least partially separate from a lateral portion of the vehicle that includes the first light source and the second light source, the light fixture including a first segment, disposed within the central portion, having a third light source and a second segment, disposed within the central portion, having a fourth light source;

the first segment configured to produce light with a first pattern via the third light source;

the second segment configured to produce light with a second pattern via the fourth light source;

the first pattern and the second pattern configured to indicate a vehicle status of the vehicle that includes a state of charge of one or more batteries of the vehicle and a charging status of the one or more batteries;

the light having the first pattern which (i) originates, at a first point in time, at a first portion of the first segment and (ii) terminates, at a second point in time, at a second portion of the first segment to indicate the charging status of the one or more batteries; and the light having the second pattern to illuminate, from the first point in time to the second point in time, across the second segment to indicate the state of charge of the one or more batteries.

2. The apparatus of claim 1, wherein the vehicle status further includes at least one of:
an autonomous drive mode of the vehicle;
a predetermined color pattern;
an unlocked state of the vehicle; or
a locked state of the vehicle.

3. The apparatus of claim 1, comprising:
a second light fixture to at least partially surround an external surface of a charging cord;
the second light fixture including a third segment having a fifth light source and a fourth segment having a sixth light source;
the third segment configured to, responsive to one or more signals, produce light with the first pattern via the fifth light source; and
the fourth segment configured to, responsive to one or more second signals, produce light with the second pattern via the sixth light source.

4. The apparatus of claim 1, wherein the first segment or the second segment is configured to produce the light having the first pattern or the light having the second pattern responsive to receipt of one or more signals, and wherein the one or more signals are received responsive to detection of at least one of:
a fob of the vehicle;
a key of the vehicle;
a user device associated with the vehicle; or
a selection of a selectable element displayed on a user interface.

5. The apparatus of claim 1, comprising:
a second light fixture to dispose between a first rear light of the vehicle and a second rear light of the vehicle, the second light fixture including a third segment having a fifth light source and a fourth segment having a sixth light source;
the third segment configured to, responsive to one or more signals, produce light with the first pattern via the fifth light source; and
the fourth segment configured to, responsive to one or more second signals, produce light with the second pattern via the sixth light source.

6. The apparatus of claim 1, comprising:
at least one of the third light source or the fourth light source configured to produce light having at least one color; and
the light having the at least one color different than a color of light produced by at least one of the first light source of the vehicle or the second light source of the vehicle.

7. The apparatus of claim 1, comprising:
memory configured to store instructions; and
a processor configured to execute the instructions to cause the processor to:
receive, via an over-the-air (OTA) update, a first update to the first pattern or a second update to the second pattern; and
transmit, to the first segment or the second segment, one or more signals to cause the first light source to product light according to the first update or to cause the second light source to product light according to the second update.

8. A vehicle, comprising:
an apparatus, including:
a light fixture to dispose within a central portion of the vehicle, the central portion (i) positioned between a first light source of the vehicle and a second light source of the vehicle and (ii) at least partially separate from a lateral portion of the vehicle that includes the first light source and the second light source, the light fixture including a first segment, disposed within the central portion, having a third light source and a second segment, disposed within the central portion, having a fourth light source;
the first segment configured to, responsive to one or more first signals, produce light with a first pattern via the third light source;
the second segment configured to, responsive to one or more second signals, produce light with a second pattern via the fourth light source;
the first pattern and the second pattern configured to indicate a vehicle status of the vehicle that includes a state of charge of one or more batteries of the vehicle and a charging status of the one or more batteries;
the light having the first pattern which (i) originates, at a first point in time, at a first portion of the first segment and (ii) terminates, at a second point in time, at a second portion of the first segment to indicate the charging status of the one or more batteries; and
the light having the second pattern to illuminate, from the first point in time to the second point in time, across the second segment to indicate the state of charge of the one or more batteries.

9. The vehicle of claim 8, wherein the vehicle status further includes at least one of:
an autonomous drive mode of the vehicle;
a predetermined color pattern;
an unlocked state of the vehicle; or
a locked state of the vehicle.

10. The vehicle of claim 8, the apparatus comprising:
the first light source and the second light source configured to receive one or more third signals to cause the first light source and the second light source to produce light with a third pattern.

11. The vehicle of claim 8, the apparatus comprising:
a second light fixture to at least partially surround an external surface of a charging cord;

the second light fixture including a third segment having a fifth light source and a fourth segment having a sixth light source;

the third segment configured to, responsive to one or more third signals, produce light with the first pattern via the fifth light source; and the fourth segment configured to, responsive to one or more fourth signals, produce light with the second pattern via the sixth light source.

12. The vehicle of claim 8, wherein at least one of the one or more first signals or the one or more second signals are received responsive to detection of at least one of:
- a fob of the vehicle;
- a key of the vehicle;
- a user device associated with the vehicle; or
- a selection of a selectable element displayed on a user interface.

13. The vehicle of claim 8, the apparatus comprising:
a second light fixture to dispose between a first rear light of the vehicle and a second rear light of the vehicle, the second light fixture including a third segment having a fifth light source and a fourth segment having a sixth light source;

the third segment configured to, responsive to the one or more first signals, produce light with the first pattern via the fifth light source; and the fourth segment configured to, responsive to the one or more second signals, produce light with the second pattern via the sixth light source.

14. A method, comprising:
disposing a light fixture of an apparatus within a central portion of a vehicle, the central portion of the vehicle (i) positioned between a first headlight of the vehicle and a second headlight of the vehicle, the light fixture including a first segment, disposed within the central portion, having a first light source and a second segment, disposed within the central portion, having a second light source;

receiving, by the first segment, one or more first signals to cause the first segment to produce light with a first pattern via the first light source;

receiving, by the second segment, one or more second signals to cause the second segment to produce light with a second pattern via the second light source; and the first segment having the light with the first pattern in combination with the second segment having the light with the second pattern configured to indicate (i) state of charge of one or more batteries of the vehicle and (ii) a charging status of the one or more batteries by having an illumination of light appear to originate at the first segment and terminate at the second segment.

* * * * *